United States Patent
Andersen et al.

(10) Patent No.: US 11,280,315 B2
(45) Date of Patent: Mar. 22, 2022

(54) WIND TURBINE MEASUREMENT SYSTEM

(71) Applicant: Siemens Gamesa Renewable Energy A/S, Brande (DK)

(72) Inventors: Jimmi Andersen, Holstebro (DK); Jan Martin Jensen, Silkeborg (DK)

(73) Assignee: SIEMENS GAMESA RENEWABLE ENERGY A/S, Brande (DK)

(*) Notice: Subject to any disclaimer, the term of this patent is extended or adjusted under 35 U.S.C. 154(b) by 1200 days.

(21) Appl. No.: 13/863,786

(22) Filed: Apr. 16, 2013

(65) Prior Publication Data

US 2013/0272877 A1 Oct. 17, 2013

(30) Foreign Application Priority Data

Apr. 17, 2012 (EP) .................................. 12164472

(51) Int. Cl.
  *F03D 7/02* (2006.01)
  *F03D 17/00* (2016.01)
  (Continued)

(52) U.S. Cl.
  CPC ............ *F03D 7/02* (2013.01); *F03D 7/0204* (2013.01); *F03D 7/0264* (2013.01); *F03D 17/00* (2016.05);
  (Continued)

(58) Field of Classification Search
  CPC ........ F03D 7/02; F03D 7/0204; F03D 7/0208; F03D 7/0212; F03D 7/0216;
  (Continued)

(56) References Cited

U.S. PATENT DOCUMENTS

| 8,890,349 B1* | 11/2014 | Lynch ..................... H02P 9/04 |
| | | 290/44 |
| 2007/0086893 A1* | 4/2007 | Pedersen ............... F03D 7/0204 |
| | | 416/61 |

(Continued)

FOREIGN PATENT DOCUMENTS

| DE | 1288494 A1 * | 3/2003 | ............... F03D 7/00 |
| EP | 1288494 A1 | 3/2003 | |

(Continued)

OTHER PUBLICATIONS

EP 1288494, Ritzinger et al. (Mar. 2003), Foreign Copy, Translated Abstract, Translated Specification.*

(Continued)

*Primary Examiner* — David E Sosnowski
*Assistant Examiner* — Aye S Htay
(74) *Attorney, Agent, or Firm* — Schmeiser, Olsen & Watts LLP (57) ABSTRACT

A measurement system is provided for a wind turbine having a plurality of rotor blades mounted to a spinner at the front of a nacelle and arranged to rotate in a rotor plane. The measurement system includes a measuring device for determining a pressure at a number of pressure measurement points. The pressure measurement points are arranged in front of the rotor plane, an analysis module for generating a control signal on the basis of the pressure measurements, and output means for issuing the control signal to a controller of the wind turbine.

12 Claims, 3 Drawing Sheets

(51) Int. Cl.
   *F03D 80/00* (2016.01)
   *G01P 5/14* (2006.01)
(52) U.S. Cl.
   CPC ........... *F03D 80/00* (2016.05); *G01P 5/14* (2013.01); *F05B 2270/30* (2013.01); *F05B 2270/3015* (2013.01); *F05B 2270/32* (2013.01); *F05B 2270/329* (2013.01); *F05B 2270/80* (2013.01); *F05B 2270/802* (2013.01); *Y02E 10/72* (2013.01)
(58) Field of Classification Search
   CPC ......... F05B 2270/301–3015; F05B 2270/324; F05B 2270/329; F05B 2270/80–802
   See application file for complete search history.

(56) References Cited

U.S. PATENT DOCUMENTS

2009/0142192 A1* 6/2009 LeClair .................. F03D 11/00
                                                    416/9
2010/0329842 A1* 12/2010 Stiesdal ................ F03D 7/0204
                                                    415/4.1
2011/0018269 A1* 1/2011 Moser .................... F03D 7/0204
                                                    290/44

FOREIGN PATENT DOCUMENTS

| | | |
|---|---|---|
| EP | 2048507 A2 | 4/2009 |
| EP | 2267301 A1 | 12/2010 |
| GB | 2067247 A | 7/1981 |
| JP | 2005188455 A | 7/2005 |
| WO | WO 2005093435 A1 | 10/2005 |

OTHER PUBLICATIONS

TF Pedersen, NS Sorensen, Luca Vita, Peder Enevoldsen "Optimization of Wind Turbine Operation by Use of Spinner Anemometer", Riso DTU National Laboratory for Sustainable Energy, Roskilde—Denmark, Aug. 2008, ISSN 0106-2840, ISBN 978-87-550-3697-7.

* cited by examiner

WIND TURBINE MEASUREMENT SYSTEM

CROSS REFERENCE TO RELATED APPLICATIONS

The present application claims priority to European Patent Office application No. 12164472.8 EP filed Apr. 17, 2012, the entire content of which is hereby incorporated herein by reference.

FIELD OF INVENTION

The invention describes a measurement system for a wind turbine; a spinner for a wind turbine; a wind turbine comprising a measurement system; and a method of controlling a wind turbine.

BACKGROUND OF INVENTION

A wind turbine can only operate efficiently if it can respond to the momentary wind conditions. For example, maximum energy can only be extracted from the wind when the wind turbine is facing essentially directly into the wind. In this position, the wind turbine can extract the most kinetic energy from the wind and convert it into electrical energy. To this end, most wind turbines are equipped with a yaw drive, for example between the wind turbine nacelle and the tower, so that the nacelle, and therefore also the hub and rotor blades, can be rotated in a yaw plane about a vertical axis extending through the tower. It is important that the yaw drive be controlled in response to any alterations in wind direction. Therefore, a wind turbine is generally also equipped with wind measuring equipment such as a wind vane for measuring wind direction and a wind speed sensor such as a mechanical or sonic anemometer. Since these devices need to be exposed to an airflow in order to generate an output signal, they can only be arranged on a stationary part of the wind turbine such as the nacelle, and preferably at an exposed position, for example on top of the nacelle. The output of a wind vane is usually fed to a yaw drive unit to adjust the yaw angle for the estimated wind direction.

However, when using sensors placed on the nacelle, the measured wind data is inaccurate on account of the turbulence generated by the upwind rotor blades and their cyclic wind shadow. Therefore, such equipment cannot measure the wind direction precisely, and cannot be used to generate a precise yaw angle. Using the prior art system, therefore, it can never be precisely determined whether the spinner is facing directly into the wind. Even a slight error in estimating the wind direction results in a corresponding "yaw angle error", and the relatively inefficient positioning of the spinner and therefore also the rotor blades results in a less than optimal power output of the wind turbine. The yaw angle error is usually defined as the difference between a vector indicating the momentary mean wind direction and a longitudinal axis of the spinner/nacelle. Ideally, the yaw angle error is zero and the momentary mean wind direction coincides with the longitudinal axis of the spinner/nacelle.

A yaw angle error is not only a problem as regards energy output of the wind turbine. Another problem is that components of the wind turbine such as bearings and the rotor blades can be subject to asymmetrical loading, so that failure as a result of material fatigue can become a problem, with ensuing maintenance and repair costs. Of course, any measuring equipment located on the outside of the nacelle is also exposed to severe weather conditions, so that costly maintenance procedures are necessary here also.

SUMMARY OF INVENTION

It is therefore an object of the invention to provide a way for a controller of a wind turbine component to respond more accurately to wind conditions.

This object is achieved by the features of the independent claim(s).

According to the invention, the measurement system for a wind turbine—comprising a number of rotor blades mounted to a spinner at the front of a nacelle and arranged to rotate in a rotor plane—comprises a measuring device for determining a pressure at a number of pressure measurement points, wherein the pressure measurement points are arranged on a windward surface of the spinner in front of the rotor plane; an analysis module for generating a control signal on the basis of the pressure measurements; and an output means for issuing the control signal to a controller of the wind turbine.

Using the accepted convention, "in front of the rotor plane" means on the upwind side the rotor plane, while the expression "behind the rotor plane" means downwind of the rotor plane, i.e. the nacelle side of the rotor plane.

The "windward surface" of the spinner is the surface that faces into the wind when the wind turbine is in operation. The invention is based on the insight that the pressure distribution over the windward surface of the spinner will depend on the momentary wind conditions. The term "pressure distribution" is to be understood to mean that the pressure exerted by the wind on the windward surface of the spinner will not be uniform, and there will be a pressure gradient between points on the spinner's windward surface.

An advantage of the measurement system according to the invention is that the measurements collected by the measuring device cannot be affected by the turbulence generated by the rotor blades, since the pressure measurement points are located in front or upwind of the rotor plane. These measurements are effectively "decoupled" from any influence of the rotor blades, and any controller that uses these measurements to control a wind turbine component can respond accurately to the momentary or prevailing wind conditions. The "wind turbine component" is to be understood to be any component or part that should respond to the wind conditions, and the "controller" is to be understood to be a controller of such a component, for example the "component" can be a yaw ring, and a "controller" can be a stepper motor or other actuator that causes the yaw ring to rotate.

According to the invention, the spinner for a wind turbine comprises a number of openings on a windward surface of the spinner, wherein an opening is connected to a measuring device of a measurement system, located behind the windward surface, for determining a pressure at that opening.

An advantage of the spinner according to the invention is that, by simply forming one or more openings in its windward surface, the spinner can serve the additional purpose of allowing the measurement system to make pressure measurements, so that the cost of mounting mechanical or sonic devices on the nacelle of the wind turbine can be saved.

According to the invention, the wind turbine comprises such a measurement system, and is therefore equipped to respond to alterations in wind conditions, for example alterations in wind speed or wind direction, in a quick and uncomplicated manner, as will be explained in the following.

An advantage of the wind turbine according to the invention is that it does not need any mechanical or sonic devices such as a wind vane or anemometer mounted on the outside of the nacelle to determine the wind direction during operation of the wind turbine, while the measurement system according to the invention allows any controller to respond quickly and accurately to the momentary wind conditions.

According to the invention, the method of controlling a wind turbine—with a number of rotor blades mounted to a spinner at the front of a nacelle and arranged to rotate in a rotor plane—comprises the steps of determining a pressure at a number of pressure measurement points, wherein the pressure measurement points are arranged in front of the rotor plane; generating a control signal on the basis of the pressure measurements; and issuing the control signal to a controller of the wind turbine.

An advantage of the method according to the invention is that it can deliver reliable and accurate control signal, since these are based on reliable and accurate pressure measurements that are unaffected by any rotor blade turbulence or rotor shadow effects.

Particularly advantageous embodiments and features of the invention are given by the dependent claims, as revealed in the following description. Features of different claim categories may be combined as appropriate to give further embodiments not described herein.

The spinner can have any shape that is suitable for bearing rotor blades and for connecting to or mounting against a nacelle or canopy of a wind turbine. For example, a spinner can have a rounded or conical "nose". However, in a particularly preferred embodiment of the invention, the spinner is essentially cylindrical in shape and comprises an essentially flat frontal face. This design has a number of advantages, since the openings or measurement points can be arranged in the same plane. Furthermore, such a spinner shape is robust, and easier to transport to the wind turbine location since it is less prone to damage. In the following therefore, without restricting the invention in any way, it may be assumed that the spinner windward surface is essentially flat, with minimal curvature, and the front face or windward surface is essentially circular or disc-shaped. In a particularly preferred embodiment of the invention, the measuring device of the measuring system is arranged in an interior cavity of the spinner. Preferably, to obtain favourably accurate measurements, the measuring device is arranged in a plane parallel to the rotor rotational plane. Of course, if the measuring device cannot be arranged in a plane parallel to the rotor rotational plane, for whatever reason, a suitable correction or compensation can be performed on the measured pressure values.

The components that can be controlled on the basis of the wind measurements can be any unit or module that is adapted to receive a control signal from the measurement system, for example, a yaw drive controller, a start-up/shutdown module of a controller of the wind turbine, a blade pitch controller, etc.

In the following, without restricting the invention in any way, it may also be assumed that the pressure measured at a measurement point is a wind pressure. A pressure sensor can also be referred to as a pressure transducer, pressure transmitter, etc. A pressure sensor can be based on various sensing techniques, for example a pressure sensor can comprise one or more bourdon gauges, piezoresistive strain gauges, etc. Such a gauge can be positioned at any suitable measurement point for measuring pressure in front of the rotor rotational plane. A pressure sensor can be located directly behind a measurement point, or can be located at a distance from it. For example, the measurement system can preferably comprise an airtight tube or duct arranged to lead from an opening at a pressure measurement point to a pressure sensor. Off-the-shelf pressure sensors or pressure transmitters are widely available.

In one preferred embodiment of the invention, the measuring device comprises a single pressure sensor arranged at a suitable point on the wind turbine in front of the rotor rotational plane, for example on the front face of the spinner. Preferably, the pressure sensor is arranged to detect any differences in pressure at that measurement point as the spinner rotates. Measurements can be taken at suitable sampling intervals and recorded. The measurements can be analysed to determine any fluctuation. For a spinner facing into the wind without any significant yaw error, the pressure should not fluctuate noticeably. Therefore, any fluctuation can indicate that the spinner is not facing correctly into the wind. The amplitude of the fluctuation can indicate by how much the spinner is offset from an ideal orientation.

In a particularly preferred embodiment of the invention, the measuring device comprises a differential pressure sensor. Such a sensor takes pressure readings from two measurement points simultaneously to determine a pressure difference between those two points. In such an embodiment, the measurement system preferably comprises a first airtight duct leading from an opening at a first pressure measurement point to the differential pressure sensor and a second airtight duct leading from an opening at a second pressure measurement point to the differential pressure sensor.

The measurement points can be located at any suitable points on the spinner's windward surface. However, in a particularly preferred embodiment of the invention, the first pressure measurement point is arranged essentially at a geometrical centre of the spinner surface, and the second pressure measurement point is arranged at a distance remote from the first pressure measurement point. With this arrangement, the first measurement point remains essentially stationary when the spinner rotates. If it is placed exactly centrally on the spinner, the first measurement point will in fact rotate about its own centre point. Even if it is not exactly centrally placed, but very close to the geometric centre point, it will only be displaced slightly when the spinner rotates, and may be regarded as essentially stationary. The second measurement point, located further away from the centre, will effectively rotate about the first measurement point as the spinner rotates. The second measurement point will therefore describe an essentially circular path of travel as the spinner rotates. Preferably, the second measurement point is located on the spinner windward face as far away from the first measurement point as possible, i.e. close to an outer edge of the spinner windward face.

As the wind impacts the spinner windward surface, it is forced by this to deflect outward in all directions. Therefore, the pressure measured at the first measurement point at the centre of the spinner surface will essentially be the highest pressure, while the pressure at the second measurement point will be lower. The difference in pressure, or "pressure differential", will be more noticeable the further away from the centre the second measurement point is placed.

With this arrangement, the pressure measured at the first measurement point will remain essentially constant, even if the spinner should be angled away from the actual wind direction, i.e. in the event of a yaw angle error. This can occur if the wind should change direction, for example.

For a spinner windward surface that is essentially vertical, the difference in pressure between the first and second measurement points will remain essentially constant when the spinner is facing directly into the wind, and can be visualized as a straight line when the pressure differential is plotted against angle for one full rotation (from 0° through to 360°) of the second measurement point. This is referred to in the following as the "reference pressure differential" for the vertical spinner face.

The inventors have realised that the pressure gradient, or the distribution of pressure zones, over the spinner windward surface will change, depending on whether the spinner is facing directly into the wind or not. Therefore, in a particularly preferred embodiment of the invention, the analysis module is realised to determine a pressure differential between the first measurement point and the second measurement point. The measured pressure differential between the first and second measurement points can be used, for example, to determine by how much, or to what degree, the spinner is facing away from the ideal mean wind direction.

When a spinner faces into the wind at an angle offset from the mean wind direction, the pressure distribution over the spinner windward surface is shifted slightly to one side. For a vertical spinner face, the pressure differential will no longer be constant, but will instead exhibit a slight oscillation relative to the reference pressure difference as the second measurement point moves through the pressure gradient along its path of travel.

However, for most large wind turbine designs, the axis of rotation of the spinner is tilted upward by about 6° from the horizontal to provide a safety clearance between the tips of the long rotor blades and the tower. For such an upward tilted spinner, the difference in pressure between the first and second measurement points will oscillate slightly when the spinner is facing directly into the wind, since the pressure in a higher outer region of the spinner windward surface will be somewhat less than the pressure in a lower outer region of the spinner windward surface. The oscillation in pressure differential can be visualized as one phase of a sine wave when the pressure differential is plotted against angle for one full rotation (from 0° through to 360°) of the second measurement point. This oscillation is referred to in the following as the "reference oscillation" for the upward tilted spinner. For an upward tilted spinner face, the pressure differential will exhibit a phase-shift and amplitude-shift relative to the reference oscillation as the second measurement point moves through the pressure gradient along its path of travel.

The development of the pressure differential measured between the first measurement point at the centre of the spinner windward face and the second measurement point can be used to determine by how much the spinner is facing away from an ideal direction, i.e. the mean wind direction. Therefore, in a particularly preferred embodiment of the invention, the analysis module comprises a yaw angle correction module, wherein a control signal generated by the yaw angle correction module comprises a yaw angle correction signal for a yaw drive unit of the wind turbine, which yaw angle correction signal is generated on the basis of the pressure differential between the first measurement point and the second measurement point. For example, the pressure differential can be compared to a reference oscillation for an upward-tilted spinner. The phase offset and/or amplitude offset can be determined to estimate the yaw angle error. The yaw angle correction module can then compute a yaw angle correction signal for use by the yaw drive unit to correct the yaw angle.

Usually, such a corrective step can be performed iteratively. For example, a yaw angle correction signal can be issued to the yaw drive unit. The analysis module continues to monitor the pressure differential and to compare it to the reference. If, after a first yaw drive correction, a noticeable difference still remains between the reference oscillation and the measured pressure differential, another yaw angle correction signal can be issued.

For safe and efficient control of a wind turbine, is also important to monitor the wind speed. The wind speed is used to determine when to stop or start the wind turbine. At high wind speeds, the rotor blades should be furled or pitched "out of the wind" in order to avoid damage to the blades, generator, prevent overspeed etc. It is also important to ensure that the blade tip speed is kept within safe limits. Furthermore, for a wind turbine that was shut down because of insufficient wind speed, the wind speed measurements can be analysed over a time period to determine whether the wind turbine should be started again. This may be the case once the average wind speed exceeds a certain minimum, while it may be deemed preferable to leave the wind turbine shut down as long as the mean wind speed is too low.

The dynamic pressure of the incoming wind airflow is the difference between the stagnation pressure (at the first measurement point) and a static or total pressure measured using a value of ambient pressure. To this end, in a particularly preferred embodiment of the invention, the measurement system comprises an additional ambient pressure measurement input, for example leading from a point anywhere in the spinner and connected to the pressure sensor. Preferably, the pressure sensor can deliver a value of dynamic pressure using these inputs. Knowing the dynamic pressure, the wind speed can be calculated using the formula:

$$q = \frac{1}{2}\rho v^2$$

where q is the dynamic pressure in pascals, ρ is the density of air in kg/m$^3$, and v is the wind speed. The calculated wind speed value can be used, as indicated above, to determine when to start or stop the wind turbine. In a further preferred embodiment of the invention, therefore, the analysis module comprises a wind speed limit determination module, wherein a control signal generated by the wind speed limit determination module comprises a start-up/shut-down signal for a controller of the wind turbine, which start-up/shut-down signal is generated on the basis of the wind speed value derived from the dynamic pressure.

The computations for calculating a pressure differential, a wind speed, an offset from a reference, or an output control signal are preferably realised as a computer program product for carrying out the steps of the method according to the invention when the computer program product is loaded into a memory of a programmable device of the measurement system.

Components of the measurement system can be arranged wherever these are most optimally accommodated. However, in a particularly preferred embodiment of the invention, the measurement system is arranged essentially entirely within the spinner of the wind turbine. Since the spinner is generally hollow with a relatively large cavity, the measurement system can easily be accommodated entirely within the spinner. In this way, the measurement system can be arranged essentially entirely in front of the rotor plane. Any pressure sensors, ducts or tubes, etc. can be mounted in the interior of the spinner and can effectively rotate with the spinner. The pressure sensors can be realised to transmit their output signals in a wireless manner to an analysis module, which can be arranged close by at a stationary location. Alternatively, the entire measurement system can rotate with the spinner, while the output signals for the controllers could be transmitted to appropriate receivers by means of a slip ring, for example, or in a wireless manner.

As mentioned above, a reference pressure differential or a reference oscillation can be used to determine an offset angle between a longitudinal axis of the spinner and the wind mean direction. Therefore, in a particularly preferred embodiment of the invention, the method comprises a calibration step to establish a reference relationship between a pressure measured at a first pressure measurement point and a pressure measured at a second pressure measurement point while an airflow is directed at the rotating spinner such that the airflow direction is essentially parallel to a longitudinal axis of the spinner. Such a calibration can be performed, for example, in a wind tunnel prior to assembly of the spinner onto a nacelle or canopy of the wind turbine. Alternatively, the calibration could be performed on site after mounting the spinner onto the nacelle, for example using an iterative control loop to bring the spinner into a position facing directly into the wind. The yaw system itself can also be used to calibrate the system. By yawing in each direction several times, the optimum calibration can be found based on the energy output from the wind turbine. When the wind turbine is facing into the wind with a zero-degree offset, a control system of the wind turbine can detect this, since this position allows the wind turbine to operate most efficiently.

While a wind turbine is shut down, during which time its spinner is no longer rotating, it may be that the wind changes direction such that the wind is no longer moving towards the spinner. In a preferred embodiment of the invention, the measurement system can be configured to respond to a situation in which the pressure sensor(s) report a "no pressure" or "negative pressure" condition. It may be that there is no wind, or the spinner if facing out of the wind. In such a situation, the analysis module can be set up to issue yaw drive control signals that gradually alter the yaw angle. If there is wind, this will be detected at some point when the spinner is once again exposed to the wind and a positive wind pressure is recorded. Otherwise, after a half rotation or a full rotation of the yaw drive, the analysis module can conclude that wind conditions are insufficient to justify start-up of the wind turbine. Alternatively or in addition, a wind turbine according to the invention can comprise a conventional weather instrument such as a wind vane to estimate the wind direction when the wind turbine is not operational. This might be advantageous to avoid situations, for example during maintenance procedures, when the wind turbine is positioned 180 degrees out of the wind. In such a situation, an upwind measuring device in the spinner of the wind turbine would not be able to determine the wind direction. Of course, instead of or in addition to the solutions given above, the wind turbine could also receive an initial yaw control signal from a park pilot, in order to be able to drive the yaw ring to face the wind turbine back into the wind again, at which point the measurement system according to the invention can take over.

BRIEF DESCRIPTION OF THE DRAWINGS

Other objects and features of the present invention will become apparent from the following detailed descriptions considered in conjunction with the accompanying drawings. It is to be understood, however, that the drawings are designed solely for the purposes of illustration and not as a definition of the limits of the invention.

DETAILED DESCRIPTION OF INVENTION

In the diagrams, like numbers refer to like objects throughout. Objects in the diagrams are not necessarily drawn to scale.

Figure 1:
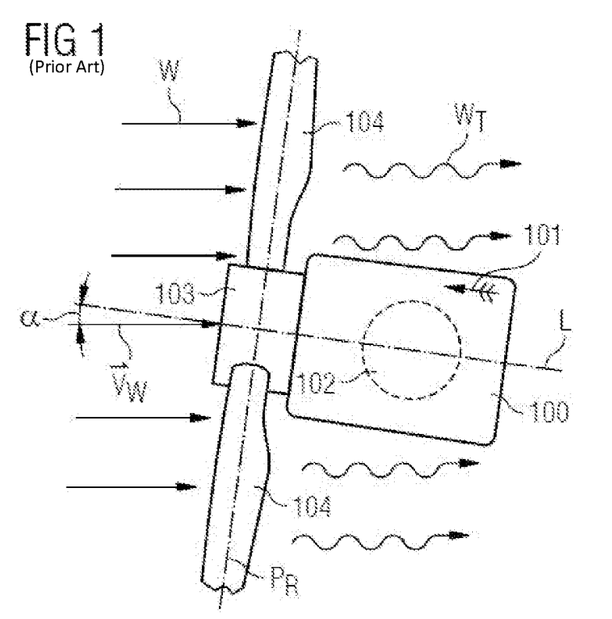
FIG. 1 shows a schematic representation of a plan view of a wind turbine in a non-ideal position relative to the wind.

FIG. 1 shows a schematic representation of a plan view of a prior art wind turbine in a non-ideal position relative to the wind. Seen from above, a nacelle 100 can be rotated by a yaw drive 102 (indicated by the broken line) with the intention of bringing a longitudinal axis L of the nacelle 100 and spinner 104 into line with the momentary direction $v_W$ of the wind W. A controller of the yaw drive 102 acts in response to measurements delivered by a wind vane 101 mounted on the top of the nacelle 100. The rotor blades 104 describe a virtual "rotor disc" or "rotor plane" $P_R$ as they rotate, indicated here by the broken line (whereby the rotor plane $P_R$ is perpendicular to the plane of the drawing). Because the wind vane 101 is situated behind the rotor plane $P_R$, and the rotor blades 104 cause a certain amount of turbulence $W_T$ behind the rotor plane, the measurements delivered by the wind vane 101 cannot accurately and reliably describe the wind direction $v_W$. As a result, the yaw drive controller may erroneously cause the nacelle 100 and spinner 103 to face in a direction offset from the ideal wind direction. This offset or yaw angle error is shown here as an angle α between the longitudinal axis L and the wind direction $v_W$. Because of the yaw angle error α and the resulting load imbalance, any major component of the wind turbine may be negatively affected. For example, the rotor blades 104 and bearings such as pitch bearings or bearings of the rotor or main shaft of the generator may be subject to undesirable fatigue loading.

Figure 2:
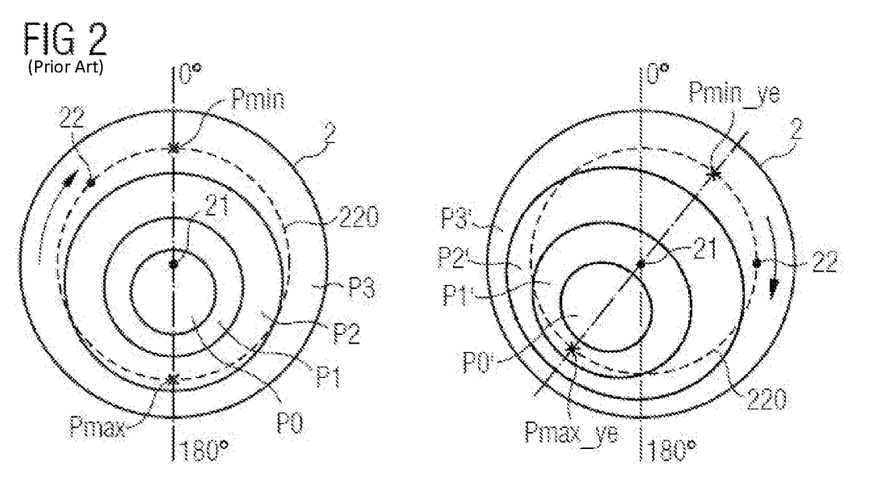
FIG. 2 shows pressure distributions over a spinner surface.

FIG. 2 shows pressure distributions over the surface of a flat spinner 2 in a first and second position of the spinner 2. Here, it is assumed that the spinner 2 is circular in shape and is mounted on a wind turbine such that it is tilted upward by a small angle of about 6° for the reasons given above. On the left-hand side of the diagram, the spinner 2 is facing directly into the wind. The pressure distribution over such a flat spinner face when tilted slightly upward is such that a highest pressure is present in a first pressure zone $P_0$ slightly offset in a downward direction from the geometric centre of the circular spinner face. The pressure drops with increasing distance from the region of highest pressure $P_0$, and this is indicated, for the sake of simplicity, by discrete pressure zones P1, P2, P3 of decreasing pressure, whereby the pressure zone P3 at the outermost edge of the spinner exhibits the lowest pressure. Of course, the pressure does not drop in a discrete manner, but drops smoothly across the pressure zones P0, P1, P2, P3 from the centre to the perimeter of the spinner face. The pressure zones P0, P1, P2, P3 are established essentially symmetrically about a vertical axis through the centre of the spinner front face when this is facing directly into the wind.

The pressure distribution remains the same while the spinner rotates (indicated by the arrow), so that a first point 21 essentially remains within the first pressure zone P0, while a second point 22 describes a circular path of travel 220 that takes it through two outer pressure zones P2, P3. Therefore, while the pressure at the first point 21 remains essentially constant, the pressure acting on the second point 22 increases and decreases in a cyclic manner as the spinner 2 rotates and the second point 22 passes in and out of the different pressure zones P2, P3 on its circular path of travel from 0° at its azimuth or highest point on the spinner front face through 180° at its lowest point on the spinner front face. A point of lowest pressure $p_{min}$ is therefore at the highest point of the path of travel 220, since this is furthest away from the stagnation pressure point 21; while the highest pressure $p_{max}$ is experienced at the lowest point of the path of travel, since this point is closest to the stagnation pressure point 21. The highest and lowest pressure points $p_{max}$, $p_{min}$ are diametrically opposed about the first point 21.

On the right-hand side of the diagram, the spinner 2 no longer faces directly into the wind, but instead faces into the wind at a detrimental yaw angle offset. The effect of this yaw angle error is that the pressure zones are no longer arranged symmetrically about a vertical axis over the spinner front face. Instead, the pressure zones P0', P1', P2', P3' are now also "offset" and somewhat distorted. As a result, the first point 21 can now lie within a lower pressure zone P1' as the spinner 2 rotates, and the second point 22 now passes in and out of several pressure zones P1', P2', P3'. In this offset yaw error position, therefore, the lowest and highest pressure $p_{min\_ye}$, $p_{max\_ye}$ experienced at the second measuring point 22 will be slightly lower than the corresponding pressures $p_{min}$, $p_{max}$ experienced at the second measuring point 22 in the non-offset position (again, the highest and lowest pressure points $p_{max}$, $p_{min}$ are diametrically opposed about the first point 21, indicated here by the slanted broken line passing through these points).

Figure 3:
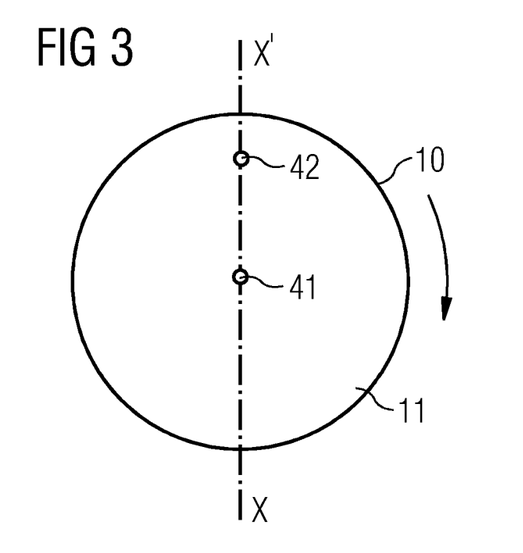
FIG. 3 shows a front view of a spinner according to an embodiment of the invention.

This effect is put to good use by the invention, as shown by a spinner 10 according to an embodiment of the invention and shown in FIG. 3. Here, the spinner 10 has two openings 41, 42 or measurement points 41, 42 arranged such that a first opening 41 is situated essentially in the geometric centre of the spinner's front face 11, and a second opening 42 is situated relatively close to an outer edge of the spinner front face 11. As described above with the aid of FIG. 2, essentially unchanging or stagnation pressure will be experienced at the first opening 41 or measurement point 41 as the spinner 10 rotates in the direction shown, while the second measurement point 42 will experience a cyclically changing pressure as it repeatedly passes through regions of higher and lower pressure. The point of lowest pressure $p_{min}$ is now offset to one side, while the point of highest pressure $p_{max}$ is offset to the other side.

Figure 4:
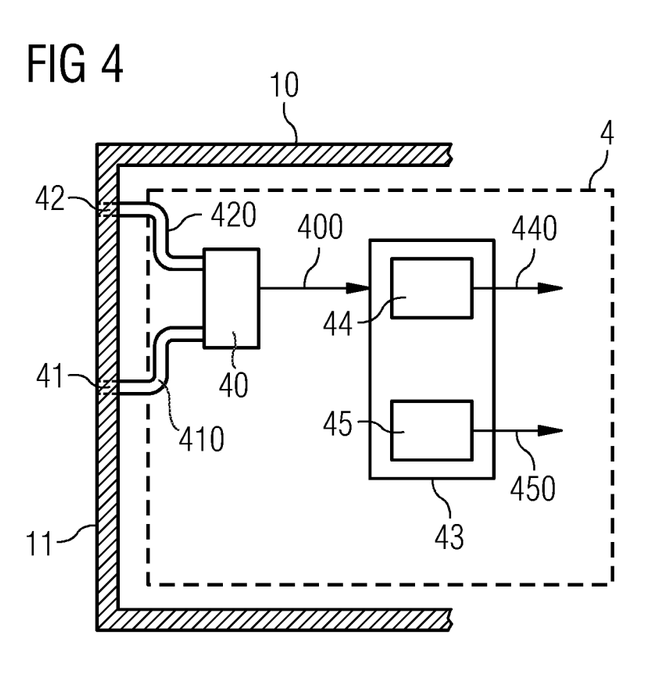
FIG. 4 shows a cross-section through the spinner of FIG. 3.

FIG. 4 shows a lateral cross-section X-X' through the spinner 10 of FIG. 3, and indicates schematically a measurement system 4 arranged in a cavity behind the front face 11 of the spinner 10. The measurement system 4 comprises a differential pressure sensor 40 connected to the openings 41, 42 by means of ducts 410, 420. The differential pressure sensor 40 generates an electrical signal 400, which can be transmitted via wire and a slip ring, or via a wireless signal, indicating the difference in pressure between the openings 41, 42. The output 400 of the differential pressure sensor 40 is received by an analysis unit 43. In this embodiment, the analysis unit 43 comprises a yaw angle correction module 44 that can determine the actual yaw angle error on the basis of the pressure sensor output 400 and/or can generate control signals 440 for a yaw drive to correct the yaw angle error. A very accurate pressure sensor 40 can permit the yaw drive to react quickly to even very slight changes in mean wind direction, so that the wind turbine to which this spinner 10 is attached can optimise its electrical output. The analysis unit 43 further comprises a wind speed limit determination module 45 that can determine the wind speed, for example a mean wind speed, on the basis of the pressure sensor output 400 and/or can generate a start-up/shut-down signal 450 for a controller of the wind turbine.

Figure 5:
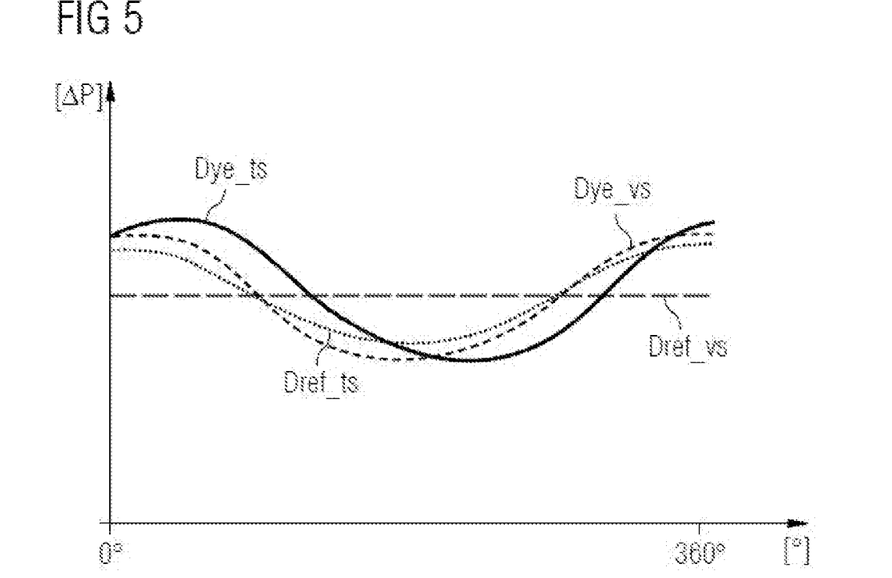
FIG. 5 shows a plot of pressure differences between two measurement positions on the spinner of FIG. 3.

FIG. 5 shows a plot of pressure difference (ΔP), against degree of rotation (°), between a first measurement point 41 and a second measurement point 42 on a spinner windward surface.

For a vertical spinner, i.e. a spinner not tilted with respect to the horizontal, a reference curve $D_{ref\_vs}$ plotted for measurements taken over one full rotation as the spinner faces directly into the wind would ideally comprise a simple flat line as shown here (broken line). A "full rotation" is measured from 0°, corresponding to the highest position of the second measurement point 42 on the spinner front face, through 360° back to the starting point. When that vertical spinner is angled away from the wind with a yaw error, for example a few degrees, the pressure differential $D_{ye\_vs}$ will manifest as one cycle of a sine wave, as shown by the dotted line. The amplitude of the sine wave and the amount by which it is offset will depend on the size of the yaw error.

For an upward tilted spinner, a reference curve $D_{ref\_ts}$ would ideally comprise one cycle of a sine wave, as shown here. The reference curve $D_{ref\_ts}$ shows a plot of the measured pressure difference between the first opening 41 and the second opening 42 as the upward-tilted spinner moves through one full rotation while facing directly into the wind. The peak of the reference curve $D_{ref\_ts}$ corresponds to the greatest pressure difference, measured when the second measurement point 42 is furthest away from the highest or stagnation pressure zone. The trough of the reference curve $D_{ref\_ts}$ corresponds to the lowest pressure difference, measured when the second measurement point 42 is closest to the stagnation pressure zone. In this case, the lowest pressure is measured when the second measurement point 42 reaches the lowest point on its path of travel 220 over the spinner windward surface, at about 180°.

Another curve $D_{ye\_ts}$ shows a plot of the measured pressure difference between the first opening 41 and the second opening 42 as the upward-tilted spinner moves through one full rotation while not facing directly into the wind, but at an angle offset from the ideal or mean wind direction. Here, the second measurement point 42 moves through several neighbouring pressure zones as illustrated in the right-hand side of FIG. 2. As a result, the pressure difference is significantly greater as the second measurement point 42 passes though the point of lowest pressure, which was indicated as point $p_{min}$ in FIG. 2. The smallest pressure difference is measured as the second measurement point 42 passes through its point of highest pressure on its path of travel over the spinner windward face which point was indicated as point $p_{max}$ in FIG. 2. The amplitude offset and the phase shift between the reference curve $D_{ref\_ts}$ and the yaw-error curve $D_{ye\_ts}$ can be determined and analysed to deduce the actual yaw error, and to generate a correction signal for a yaw drive controller. Such a correction signal can, for example, instruct the yaw drive controller to "rotate yaw ring clockwise by 4.5°", "rotate yaw ring counter-clockwise by 1.8°", etc. Alternatively, the control signal can just specify a direction of (slow) rotation for the yaw drive controller, for example "clockwise", and can continue to measure amplitude and phase shift until these are no longer significant, at which point a control signal can then instruct the yaw drive controller to cease rotation and to maintain that position.

Figure 6:
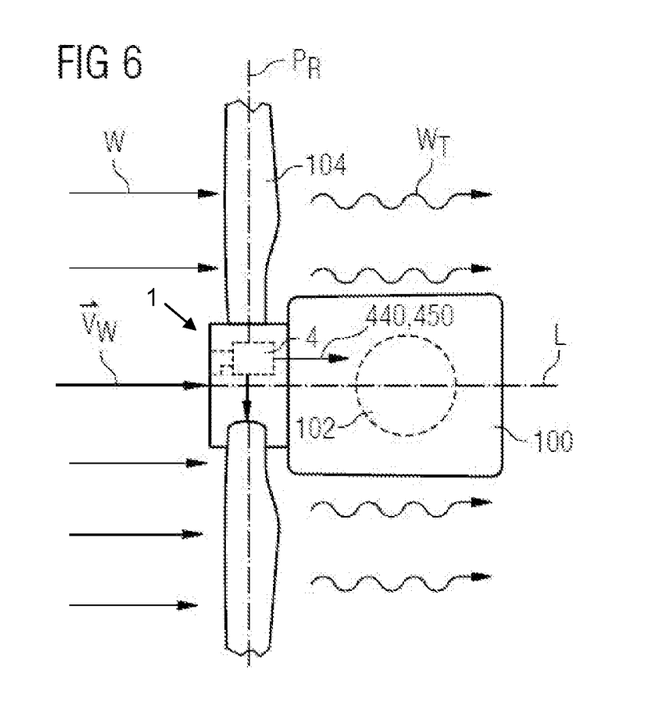
FIG. 6 shows a schematic representation of a plan view of a wind turbine according to an embodiment of the invention.

FIG. 6 shows a schematic representation of a plan view of a wind turbine according to an embodiment of the invention. This wind turbine has a spinner 10 according to the invention, with a yaw angle adjustment system 1 arranged in the spinner 10 and connected by means of an output to a controller of a yaw drive (indicated by the broken line). The yaw angle adjustment system 1 can continually monitor the pressure differences at the measurement points to detect any yaw angle error. Since any measurements are made using information collected at the spinner front face 11, these measurements are free of any inaccuracies that would be introduced by a turbulent air-flow $W_T$ behind the rotor plane of the rotor blades 104. Therefore, the yaw angle adjustment system 1 can always act to bring the spinner 10 in line with the momentary mean wind direction $v_W$, as shown here, so that the power output of the wind turbine can be optimised.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A measurement system for a wind turbine comprising a plurality of rotor blades and a nacelle, the measurement system comprising:
a spinner disposed at a front of the nacelle, wherein the plurality of rotor blades are mounted to the spinner and arranged to rotate in a rotor plane, the spinner having a cylindrical shape and comprising a flat frontal face that faces incoming wind flowing in a wind direction and an annular wall extending from the flat frontal face towards the nacelle, the flat frontal face and the annular wall of the spinner defining a single interior cylindrical cavity;
a plurality of pressure measurement points disposed on the flat frontal face of the spinner, the plurality of pressure measurement points being openings that extend through the flat frontal face of the spinner to allow wind to flow through the flat frontal face of the spinner, wherein the plurality of pressure measurement points include a first opening located proximate a geometric center of the flat frontal face of the spinner and a second opening proximate an outer edge of the flat front face of the spinner, further wherein the first opening and the second opening are both disposed on the flat frontal face such that the first opening and the second opening are coplanar and on a same plane as the flat frontal face; and
a wind measurement system disposed within the spinner, the wind measurement system comprising a pressure differential sensor connected to the plurality of pressure measurement points located behind the flat frontal face of the spinner within the interior cavity, the pressure differential sensor being configured to determine a difference in pressure between the plurality of pressure measurement points, wherein an output signal of the pressure differential sensor is analyzed to generate a control signal for a yaw drive to correct a yaw angle error between a longitudinal axis of the nacelle and the wind direction.

2. The system according to claim 1, wherein a first duct connects the first opening to the pressure differential sensor and a second duct connects the second opening to the pressure differential sensor.

3. The system according to claim 1, wherein the wind measurement system includes an analysis module configured to determine a stagnation pressure value and/or a dynamic pressure value.

4. The system according to claim 3, wherein the analysis module comprises a yaw angle correction module that generates the control signal, which is a yaw angle control signal that comprises a yaw angle correction signal for the yaw drive of the wind turbine.

5. The system according to claim 3, wherein the analysis module comprises a wind speed limit determination module that generates a control signal comprising a start-up/shut-down signal for a controller of the wind turbine, and wherein the start-up/shut-down signal is based on a dynamic pressure value.

6. A spinner for a wind turbine, comprising:
a flat frontal face that faces incoming wind flowing in a wind direction;
an annular wall extending from the flat frontal face towards a nacelle of the wind turbine to define a single interior cylindrical cavity of the spinner;
a plurality of pressure measurement points disposed on the flat frontal face of the spinner, the plurality of pressure measurement points being openings that extend through the flat frontal face of the spinner to allow wind to flow through the flat frontal face of the spinner, wherein the plurality of pressure measurement points include a first opening located proximate a geometric center of the flat frontal face of the spinner and a second opening proximate an outer edge of the flat front face of the spinner, further wherein the first opening and the second opening are both disposed on the flat frontal face such that the first opening and the second opening are coplanar and on a same plane as the flat frontal face;
a cavity defined by the flat frontal face and the annular wall, the cavity located behind and immediately adjacent to the flat frontal surface of the spinner; and
a wind measurement system disposed within the spinner, the wind measurement system comprising a pressure differential sensor connected to the plurality of pressure measurement points located behind the flat frontal face of the spinner within the interior cavity, the pressure differential sensor being configured to determine a difference in pressure between the plurality of pressure measurement points, wherein an output signal of the pressure differential sensor is analyzed to generate a control signal for a yaw drive to correct a yaw angle error between a longitudinal axis of the nacelle and the wind direction.

7. The spinner according to claim 6, wherein the flat frontal surface of the spinner is a flat disc-shaped surface.

8. A wind turbine comprising:
the wind measurement system according to claim 1.

9. The wind turbine according to claim 8, comprising a yaw drive controller adapted to receive the control signal from the measurement system and/or a blade pitch controller adapted to receive the control signal from the wind measurement system.

10. A method of controlling a wind turbine comprising a number of rotor blades mounted to a spinner at a front of a nacelle and arranged to rotate in a rotor plane, wherein the spinner has a cylindrical shape and comprises a flat frontal face that faces incoming wind flowing in a wind direction and an annular wall extending from the flat frontal face towards the nacelle, the flat frontal face and the annular wall of the spinner defining a single interior cylindrical cavity, and a plurality of pressure measurement points disposed on the flat frontal face of the spinner, the plurality of pressure measurement points being openings that extend through the flat frontal face of the spinner to allow wind to flow through the flat frontal face of the spinner, wherein the plurality of pressure measurement points include a first opening located proximate a geometric center of the flat frontal face of the spinner and a second opening proximate an outer edge of the flat front face of the spinner, further wherein the first opening and the second opening are both disposed on the flat frontal face such that the first opening and the second opening are coplanar and on a same plane as the flat frontal face, the method comprising:

determining a pressure at the plurality of pressure measurement points, via a measuring device arranged in the interior cavity of the spinner;

generating a control signal based on an output signal of the measuring device for a yaw drive to correct a yaw angle error between a longitudinal axis of the nacelle and the wind direction; and issuing the control signal to a corresponding controller of the yaw drive of the wind turbine.

11. The method according to claim 10, further comprising analyzing the pressure to further determine a pressure difference between any pair of the plurality of measurement points and/or to further determine a dynamic pressure and/or a stagnation pressure.

12. The method according to claim 10, further comprising establishing a reference relationship between a pressure measured at a first pressure measurement point and a second pressure measurement point while an airflow is directed at the spinner such that the airflow direction is essentially parallel to a longitudinal axis of the spinner.

* * * * *